(12) United States Patent
Ku et al.

(10) Patent No.: US 11,030,383 B2
(45) Date of Patent: Jun. 8, 2021

(54) INTEGRATED DEVICE AND METHOD OF FORMING THE SAME

(71) Applicant: TAIWAN SEMICONDUCTOR MANUFACTURING COMPANY LTD., Hsinchu (TW)

(72) Inventors: Chun-Yao Ku, Taipei (TW); Wen-Hao Chen, Hsin-Chu (TW); Ming-Tao Yu, Hsinchu (TW); Shao-Huan Wang, Taichung (TW); Jyun-Hao Chang, Kaohsiung (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/883,546

(22) Filed: May 26, 2020

(65) Prior Publication Data

US 2020/0285798 A1    Sep. 10, 2020

Related U.S. Application Data

(63) Continuation of application No. 16/020,132, filed on Jun. 27, 2018, now Pat. No. 10,678,991.

(51) Int. Cl.
*G06F 30/398* (2020.01)
*G06F 30/394* (2020.01)
*G06F 119/10* (2020.01)

(52) U.S. Cl.
CPC .......... *G06F 30/398* (2020.01); *G06F 30/394* (2020.01); *G06F 2119/10* (2020.01)

(58) Field of Classification Search
CPC .. G06F 30/398; G06F 30/394; G06F 17/5081; G06F 17/5077
USPC ......................................... 716/110, 111, 115
See application file for complete search history.

(56) References Cited

U.S. PATENT DOCUMENTS

| | | | |
|---|---|---|---|
| 9,977,857 B1* | 5/2018 | Ku et al. | G06F 30/398 |
| 10,289,794 B2* | 5/2019 | Wang et al. | G06F 30/327 |
| 10,360,342 B2* | 7/2019 | Ou et al. | G06F 30/398 |
| 10,658,292 B2* | 5/2020 | Peng et al. | H01L 23/5283 |
| 10,678,991 B2* | 6/2020 | Ku et al. | G06F 30/398 |

* cited by examiner

*Primary Examiner* — Sun J Lin
(74) *Attorney, Agent, or Firm* — WPAT, P.C., Intellectual Property Attorneys; Anthony King

(57) ABSTRACT

A method of forming an integrated device includes: providing a first via pillar file specifying a first via pillar; providing a second via pillar file specifying a second via pillar; arranging, by a processor, the first via pillar to electrically connect to a circuit cell in a first circuit; arranging an interconnecting path for electrical connection of the first via pillar to another circuit cell in the first circuit; arranging, by the processor, the second via pillar to replace the first via pillar when the first via pillar induces an electromigration (EM) phenomenon; re-routing the interconnecting path with replacement of the first via pillar to generate a second circuit when the first via pillar induces the EM phenomenon; and generating the integrated device according to the second circuit.

20 Claims, 15 Drawing Sheets

INTEGRATED DEVICE AND METHOD OF FORMING THE SAME

PRIORITY CLAIM AND CROSS-REFERENCE

The present application is a continuation application of U.S. patent application Ser. No. 16/020,132 filed on Jun. 27, 2018, which is incorporated herein by reference in its entirety.

BACKGROUND

Electromigration (EM) is the transport of metal atoms when an electric current flows through a metallic structure in an integrated circuit (IC). For instance, EM can cause metal atoms to be removed from a portion of a metal trace thereby creating a void and possibly an open-circuit failure in the integrated circuit. With shrinking wire dimensions and increasing currents, the current densities in lower metal layers within the cells are also now in the range where EM effects are visible. To avoid EM effect, some may over-design cell by putting much BEOL resource for cell EM signoff, and this turns in poor routing and impact Power Performance Area (PPA) result.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
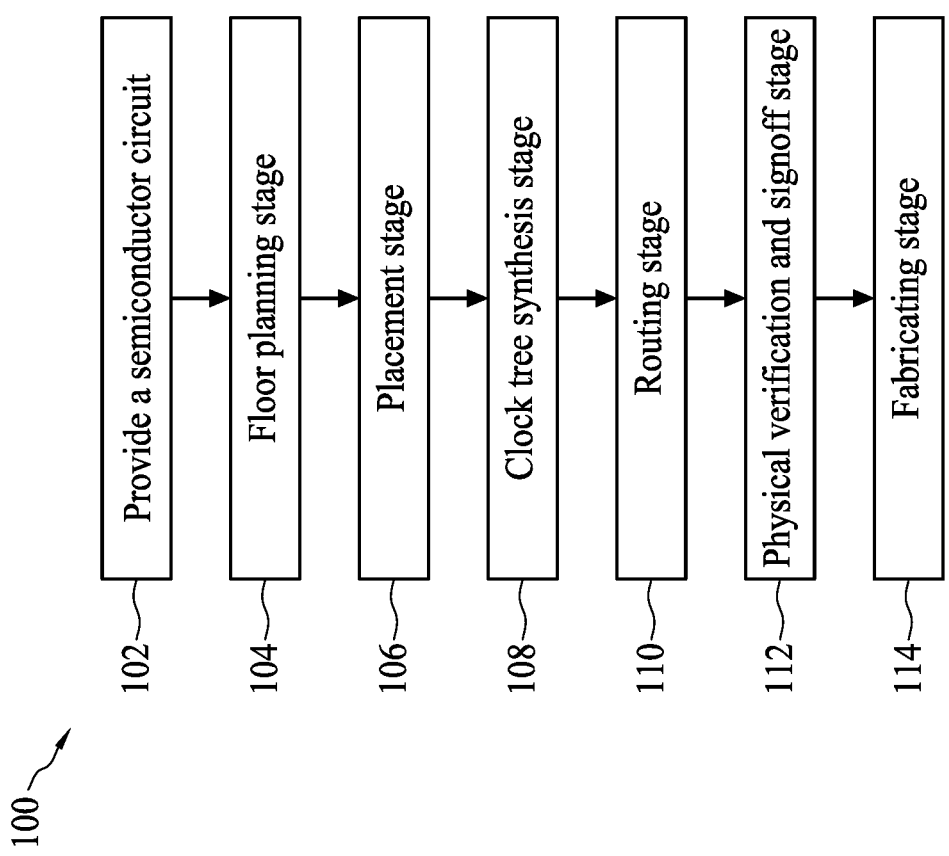
FIG. 1 is a flowchart of a fabricating flow for forming an integrated circuit in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a flowchart of a fabricating flow 100 for forming an integrated circuit (IC) or a semiconductor device in accordance with some embodiments. The fabricating flow 100 utilizes at least one electronic design automation (EDA) tool and at least one fabrication tool to carry out one or more operations in the flow 100. During the Automatic Placement and Routing (APR) flow, there would be EM violation when the current on the output pin of standard cell exceeds the maximum tolerable current. During APR flow, the maximum tolerable current is often transformed to the maximum toggle rate that can be derived based on the input transition and the loading capacitance. To overcome EM violation, designer can preemptively widen output pin of standard cell to amplify allowable current or construct via pillar to bypass current evenly into multiple metal shapes. Although, these preemptive approaches can effectively overcome EM violations, not all metal or wires in the IC would have EM risk, and the incurred metal shapes would hurt routing resource. The present embodiments propose a method to swap a minimum EM via pillar, which has occupies the least amount of routing resource, into an appropriate via pillar to overcome EM violation and to avoid the waste of routing resource. According to some embodiments, the output pin of a circuit cell is assigned to the appropriate via pillar based on the toggle rate and/or the loading capacitance of the output pin to alleviate the EM phenomenon and obtain better PPA result with reduced pin density.

At a synthesis stage 102, a high-level design of an IC chip is provided by a circuit designer. In some embodiments, a semiconductor circuit is generated through the logic synthesis based on the high-level design and gates in the semiconductor circuit are mapped to available cells in a standard cell library. The semiconductor circuit may be a gate-level netlist. The term "netlist" used herein refers to both graphical-based representation such as a schematic and/or a text-based representation of a circuit. During the synthesis stage, the RTL (Register Transfer Level) design is converted to gate-level descriptions. The gate-level netlist contains information of the cells, the corresponding interconnections, the area, and other details. The cells may be various standard cells selected from the standard cell library. In addition, during the synthesis stage, constraints may be applied to ensure that the gate-level design meets the required function and speed.

At a floor planning stage 104, the semiconductor circuit is partitioned into functional blocks and a floorplan for the functional blocks in a design layout of the IC chip is created. The floor planning stage is the process of identifying structures that can be placed close together, and allocating space for the structures to meet the required area and performance, for example, of the design layout. The floor planning stage takes into account the macros, memory, and/or other IP cores used in the design layout. The floor planning stage also takes into account the corresponding placement of the circuit blocks used in the design layout. According to some embodiments, the floor planning stage determines the IO structure and aspect ratio of the design layout.

At a placement stage 106, mapped cells of logic gates and registers of the circuit blocks are placed at specific locations in the design layout.

At a clock tree synthesis (CTS) stage 108, a CTS tool may automatically designs a clock tree for distributing a clock signal to a plurality of clocked devices such as flip-flops, registers, and/or latches that change state in response to clock signal pulses. The CTS tool may lay out the conductors forming the clock tree in a way that tries to equalize the distance the clock signal travelling to each clocked device from an IC input terminal receiving the clock signal from an external source. The CTS tool may place buffers or amplifiers at branch points of the tree sized as necessary to drive all of the buffers or clocked devices downstream of the branch point. Based on an estimate of the signal path delay in each branch of the clock tree, the CTS tool may balance the clock tree by inserting addition buffers in selected branches of the clock tree to adjust the path delays within those branches to ensure that the clock tree will deliver each clock signal pulse to every clocked device at nearly the same time.

At a routing stage 110, signal nets are routed. Routing of signal nets comprises the placement of signal net wires on a metal layer among placed standard cells to carry non-power signals between different functional blocks.

At a physical verification and signoff stage 112, layout-versus-schematic (LVS) is performed on a physical netlist generated from the design layout to ensure correspondence of the design layout to the semiconductor circuit. Further, design rule check (DRC) is performed on the design layout to ensure the design clean of, for example, electrical issues and lithographic issues for manufacturing. Incremental fixing can be performed to achieve final signoff of the IC chip design before tape-out.

At a fabricating stage 114, a fabricating tool receives a GDS file corresponding to the IC chip for fabrication. The GDS file is a graphical representation of the integrated chip that can be subsequently used for making photomasks used in the IC fabrication process. In the fabricating stage 116, a semiconductor device corresponding to the GDS file is fabricated.

Figure 2:
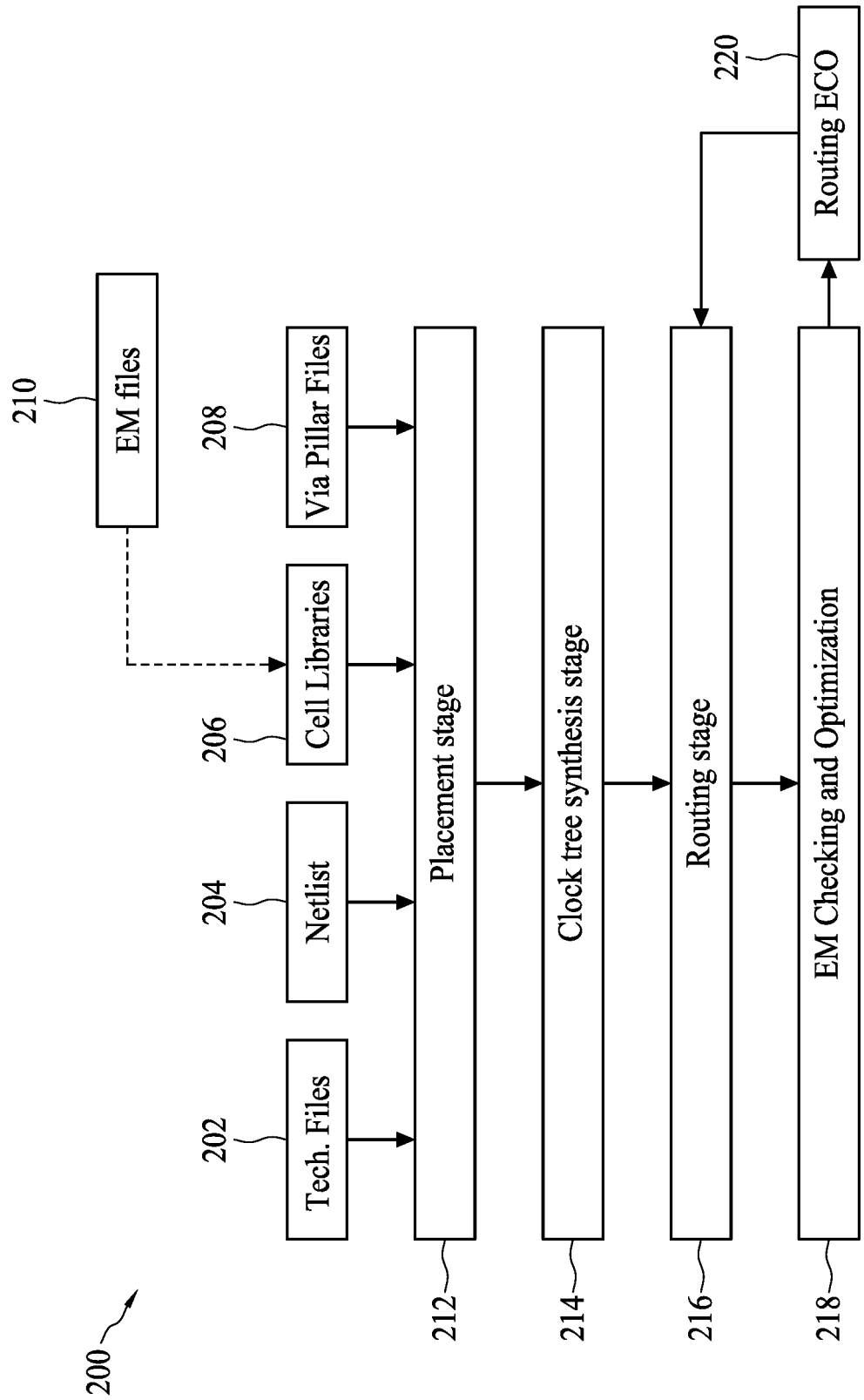
FIG. 2 is a flowchart illustrating a process including an EM checking and optimization for an integrated circuit in accordance with some embodiments.

According to some embodiments, EM checking and optimization is performed upon the integrated circuit during the fabricating flow 100. For example, the EM checking and optimization may be performed after the routing stage 110 of the fabricating flow 100. FIG. 2 is a flowchart illustrating a process 200 including an EM checking and optimization for the integrated circuit in accordance with some embodiments. The process 200 comprises operations 202-220. In operation 202, technology files related to the semiconductor fabricating process is provided. In operation 204, a netlist of the integrated circuit is provided. In operation 206, standard cell libraries are provided. In operation 208, via pillar files are provided. In operation 210, a plurality of EM files corresponding to a plurality of via pillars are provided to the standard cell libraries. In operation 212, a placement of the circuit cells in the integrated circuit is performed according to the technology files, the netlist, the standard cell libraries, and the via pillars. The operation 212 may similar to the above mentioned placement stage 106. In operation 214, a clock tree synthesis is performed upon the design layout of the integrated circuit. The operation 214 may similar to the above mentioned CTS stage 108. In operation 216, a routing process is performed upon the design layout of the integrated circuit. The operation 216 may similar to the above mentioned routing stage 110. In operation 218, an EM checking and optimization is performed upon the design layout of the integrated circuit is performed. The EM checking and optimization is performed after the operations 212-216. According to some embodiments, the EM checking and optimization comprises checking of the EM tolerance on the output pin or via pillar of standard cell according to EM file based on the actual routing condition, and constructing a via pillar or replacing the via pillar by another via pillar and/or re-routing the interconnecting path to fix the EM violation based on the maximum toggle rate. In operation 220, a routing ECO (Engineering Change Order) operation is performed to construct a via pillar or replacing the via pillar by another via pillar. When the routing ECO operation is performed, the method 200 may re-route the interconnecting path to fix the EM violation based on the maximum toggle rate (i.e. the operation 216).

Figure 3:
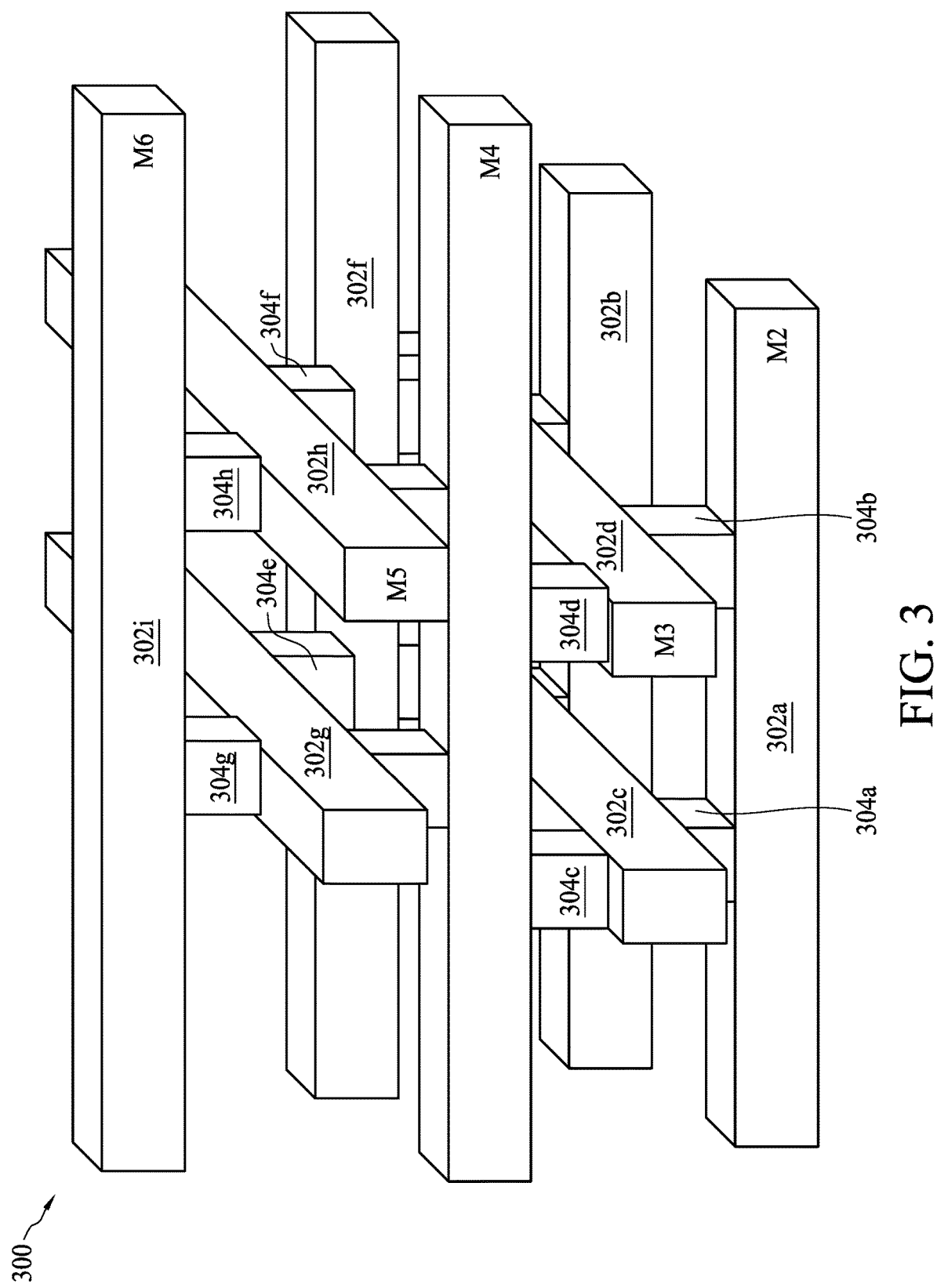
FIG. 3 is a diagram illustrating a via pillar in accordance with some embodiments.

FIG. 3 is a diagram illustrating a via pillar 300 in accordance with some embodiments. In this embodiment, the via pillar 300 comprises a plurality of metal lines (e.g. 302a-302i) and a plurality of vias (e.g. 304a-304h). The metal lines 302a-302i are formed on the metal layers M2, M3, M4, M5, and M6 respectively. Each of the vias 304a-304h is arranged to electrically connect two metal lines on different metal layers among the metal lines 302a-302i. For example, the via 304a is arranged to electrically connect the metal line 302a on the second metal layer M2 to the metal line 302c on the third metal layer M3. The bottom metal lines 302a and 302b on the second metal layer M2 may electrically connect to the output pin of a standard cell. Accordingly, a via pillar is a lattice structure connect to a standard cell. The via pillars is formed by closely spaced pairs of vias and metal lines where the vias pass through several interconnect layers.

Figure 4:
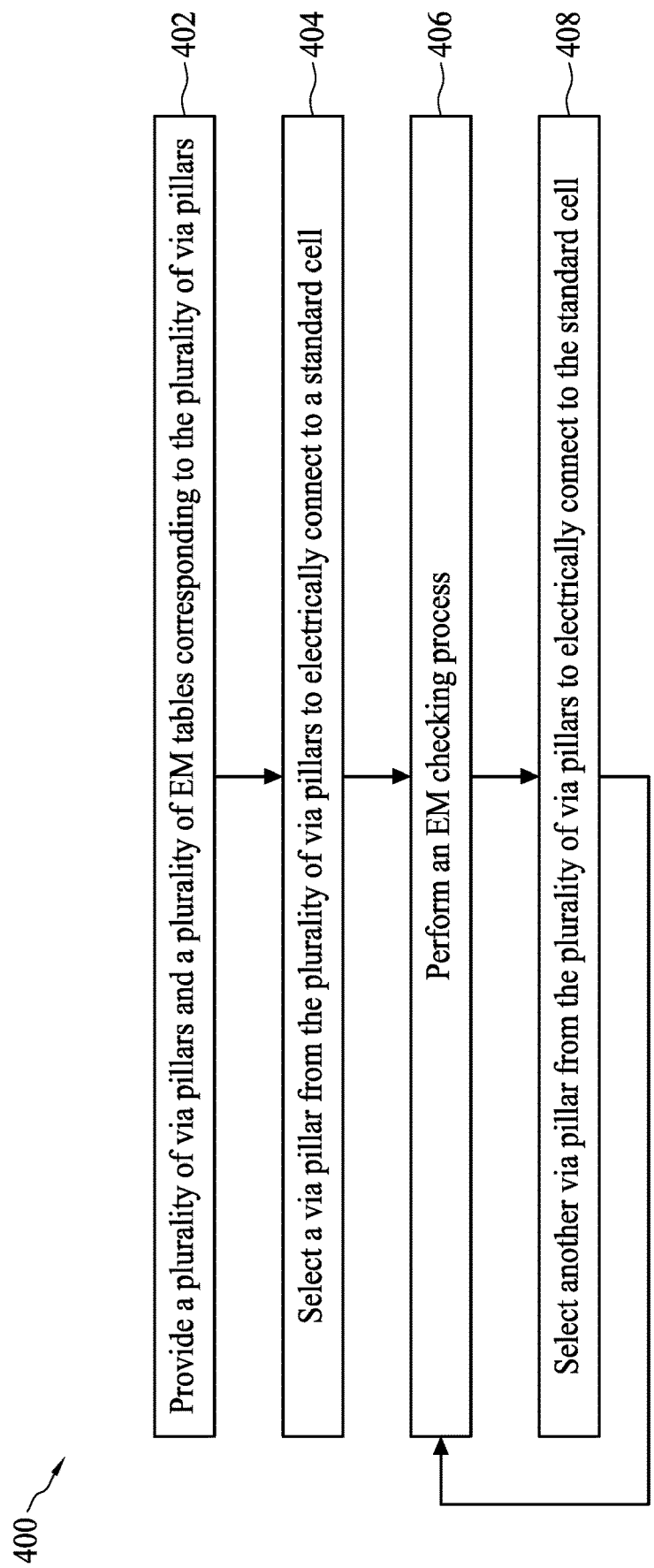
FIG. 4 is a flowchart of an EM checking and optimization for an integrated circuit in accordance with some embodiments.

FIG. 4 is a flowchart of an EM checking and optimization 400 for the integrated circuit in accordance with some embodiments. The EM checking and optimization 400 comprises operations 402-408. In operation 402, a plurality of via pillars and a plurality of EM files corresponding to the plurality of via pillars are provided.

Figure 5:
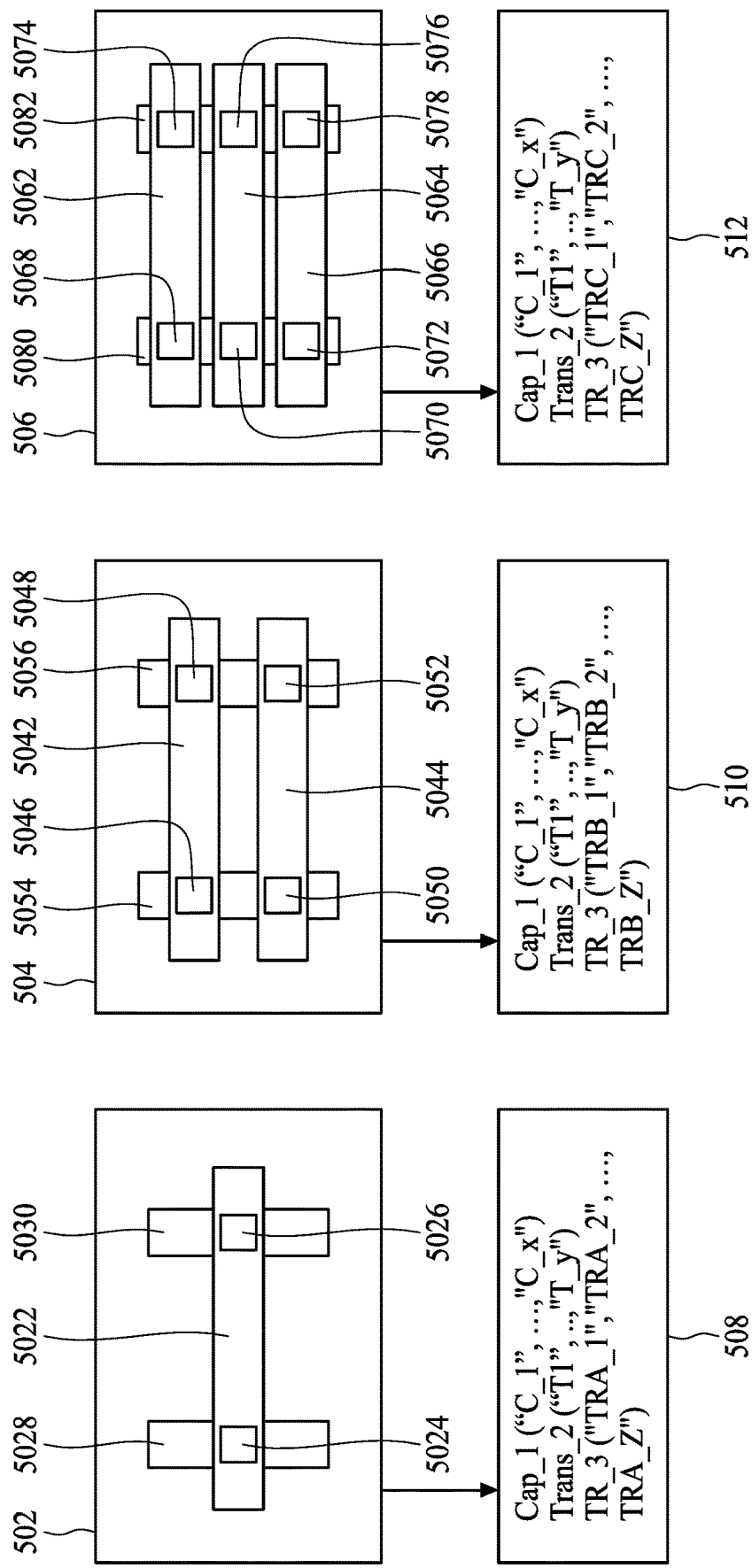
FIG. 5 is a diagram illustrating a plurality of via pillars and a plurality of EM files in accordance with some embodiments.

FIG. 5 is a diagram illustrating a plurality of via pillars 502-506 and a plurality of EM files 508-512 corresponding to the plurality of via pillars 502-506 respectively. For brevity, FIG. 5 merely shows the top-view diagram of three different via pillars. According to some embodiments, the first via pillar 502 comprises a metal line 5022 and two vias 5024, 5026. The vias 5024 and 5026 are arranged to electrically connect the metal line 5022 to a standard cell. For brevity, the standard cell is represented by the metal layers 5028 and 5030. The metal line 5022 may be formed on the second metal layer M2, and the metal layers 5028 and 5030 may be formed on the first metal layer M1. The first EM file 508 records a plurality of maximum toggle rates TRA_1-TRA_z with respect to a plurality of loading capacitances C_1-C_x and a plurality of transitions T_1-T_y of the first via pillar 502. According to some embodiments, the first EM file 508 may be a lookup table recording the relationship among the plurality of loading capacitances C_-C_x, the plurality of transitions T_1-T_y, and the plurality of maximum toggle rates TRA_1-TRA_z of the first via pillar 502. For example, when the loading capacitance C_1 is 0.0008 F (Farad) and the transition T_1 is 0.00016V (Volt), the maximum toggle rate TRA_1 may be 215.435 times/ns (times per nanosecond).

The second via pillar 504 comprises two metal lines 5042, 5044, and four vias 5046, 5048, 5050, and 5052. The vias 5046, 5048, 5050, and 5052 are arranged to electrically connect the metal lines 5042 and 5044 to a standard cell respectively. For brevity, the standard cell is represented by the metal layers 5054 and 5056. The metal lines 5042 and 5044 may be formed on the second metal layer M2, and the metal layers 5054 and 5056 may be formed on the first metal layer M1. The second EM file 510 records the plurality of loading capacitances C_1-C_x, the plurality of transitions T_1-T_y, and a plurality of maximum toggle rates TRB_1-TRB_z of the second via pillar 504.

The third via pillar 506 comprises three metal lines 5062, 5064, 5066 and six vias 5068, 5070, 5072, 5074, 5076, and 5078. The vias 5068, 5070, 5072, 5074, 5076, and 5078 are arranged to electrically connect the metal lines 5062, 5064, and 5066 to a standard cell respectively. For brevity, the standard cell is represented by the metal layers 5080 and 5082. The metal lines 5062, 5064, and 5066 may be formed on the second metal layer M2, and the metal layers 5080 and 5082 may be formed on the first metal layer M1. The third EM file 512 records the plurality of loading capacitances C_1-C_x, the plurality of transitions T_1-T_y, and a plurality of maximum toggle rates TRC_1-TRC_z of the third via pillar 506.

For a via pillar, the loading capacitance may be the parasitic capacitance of the interconnecting path connected to the via pillar. The transition is the value of voltage level changing from the low voltage level to the high voltage level, or the value of voltage level changing from the high voltage level to the low voltage level on the via pillar. The toggle rate is the number of toggles per time-unit of a circuit cell. For example, a toggle rate of 100% means that the output frequency of a circuit cell is 50 MHz if the clock frequency of the circuit cell is 100 MHz. The maximum toggle rate of a via pillar means the maximum tolerable toggle rate of the via pillar connecting to the circuit cell. When the toggle rate of the circuit cell is greater than the maximum toggle rate, the via pillar connected to the circuit cell may induce an EM phenomenon. The maximum toggle rate of a via pillar is depended on the loading capacitance and the transition on the via pillar. For example, when the loading capacitance and the transition on the first via pillar 502 are C_1 and T1 respectively, the maximum toggle rate of the first via pillar 502 is TRA_2. If the toggle rate of the standard cell is greater than the maximum toggle rate TRA_2, the first via pillar 502 connected to the standard cell may induce the EM phenomenon.

Figure 6:
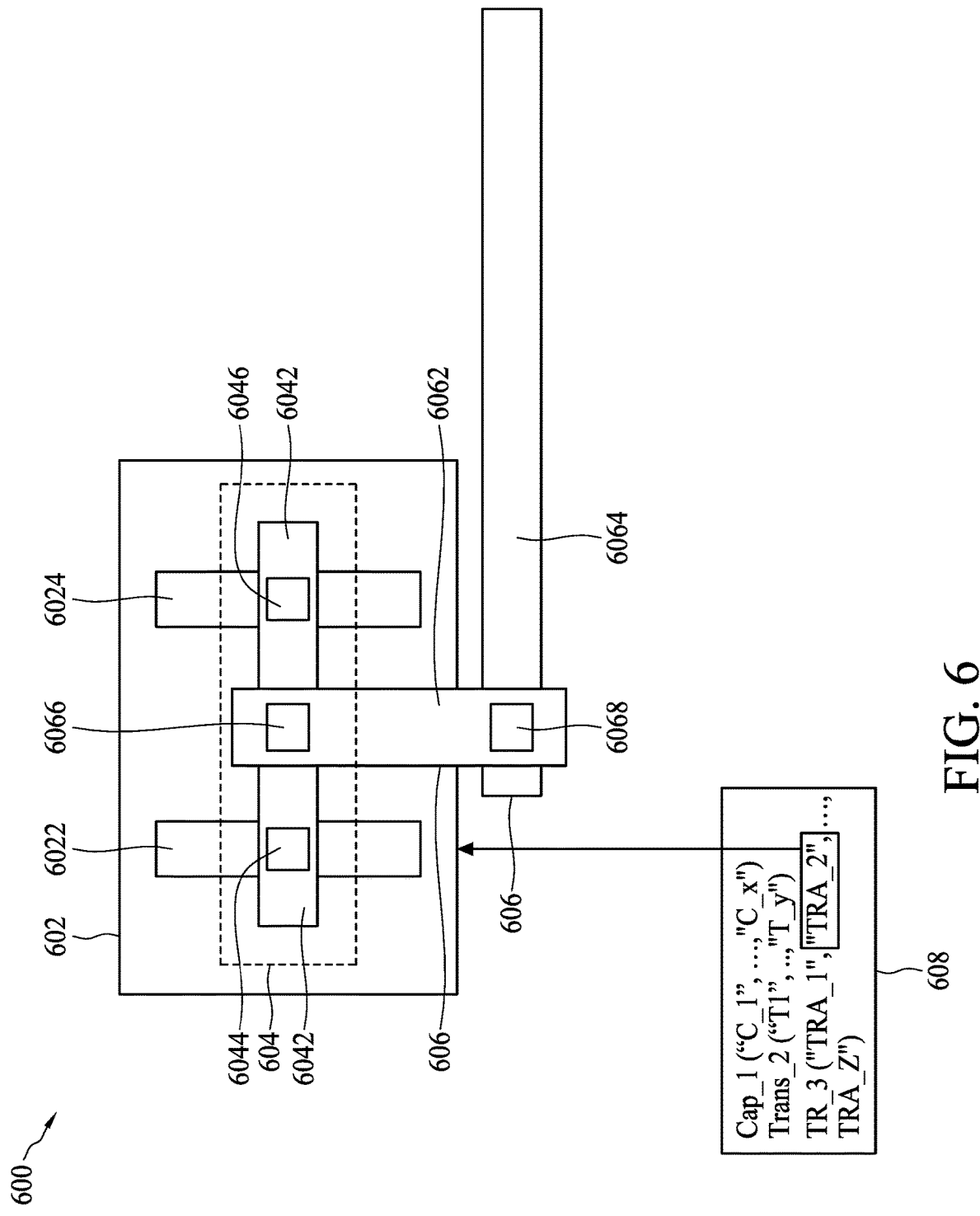
FIG. 6 is a diagram illustrating a partial circuit of an integrated circuit in accordance with some embodiments.

In operation 404, a via pillar in the plurality of via pillars 502-506 is selected to electrically connect to a standard cell of the integrated circuit during the placement stage. FIG. 6 is a diagram illustrating a partial circuit 600 of the integrated circuit in accordance with some embodiments. The partial circuit 600 comprises a standard cell 602, a via pillar 604, and an interconnecting path 606. The standard cell 602 is represented by metal lines 6022 and 6024. The metal lines 6022 and 6024 may be formed on the first metal layer M1. The via pillar 604 may be the first via pillar 502 as shown in FIG. 5. The via pillar 604 comprises a metal line 6042 and two vias 6044, 6046. The metal line 6042 is formed on the second metal layer M2. The vias 6044 and 6046 are arranged to electrically connect the metal line 6042 to the metal lines 6022 and 6024 respectively. The interconnecting path 606 comprises a first metal line 6062, a second metal line 6064, a first via 6066, and a second via 6068. The metal line 6062 is formed on the third metal layer M3. The metal line 6064 is formed on the second metal layer M2. The vias 6066 and 6068 are arranged to electrically connect the metal line 6062 to the metal lines 6042 and 6064 respectively. The interconnecting path 606 is arranged to electrically connect the via pillar 604 to another circuit cell (not shown).

Figure 7:
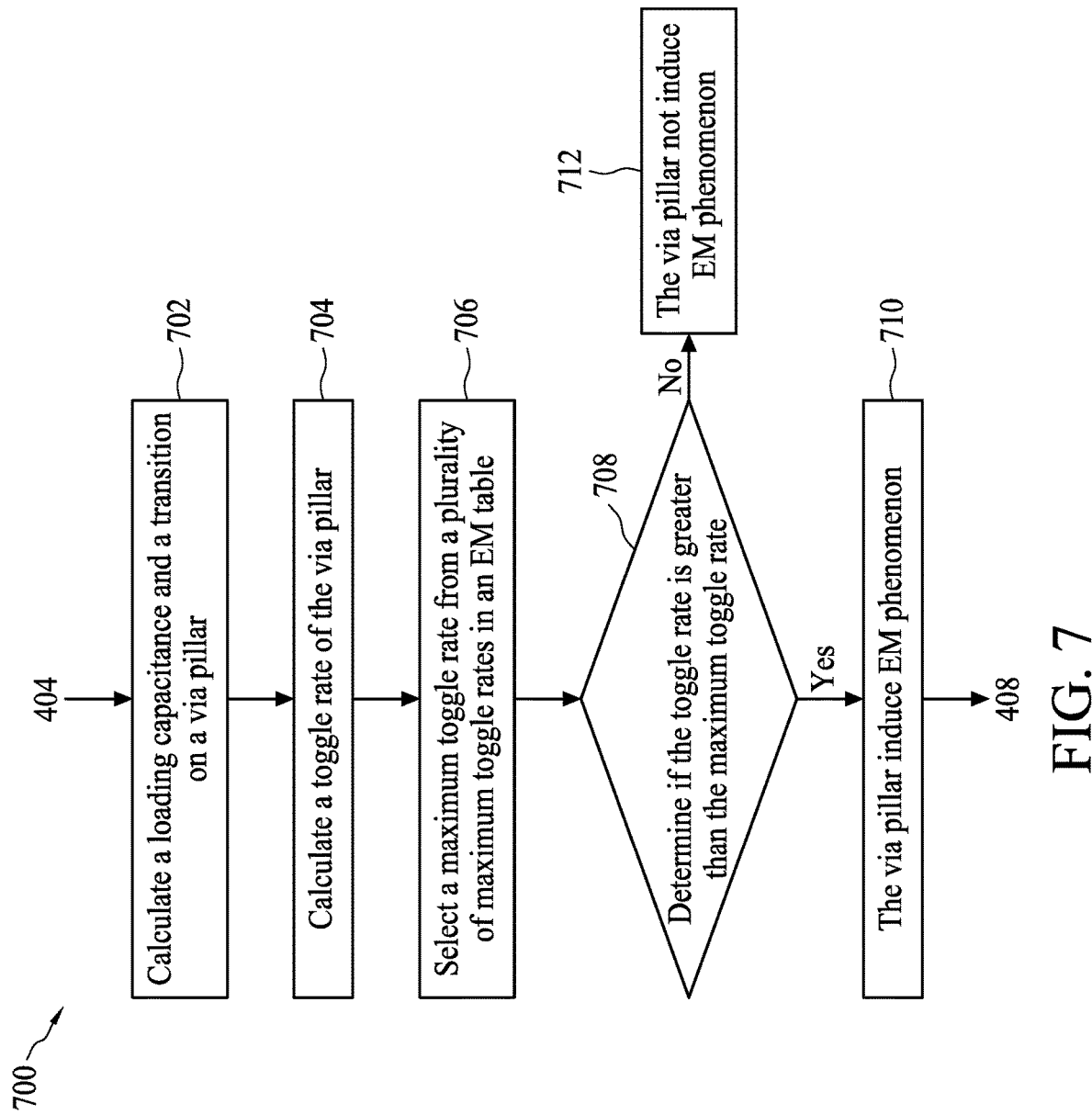
FIG. 7 is a flowchart of an EM checking process in accordance with some embodiments.

In operation 406, an EM checking process is performed upon the partial circuit 600 to determine if the via pillar 604 induces the EM phenomenon. The EM checking process may analyze the EM information of the via pillar 604 in the partial circuit 600. The EM information may be the toggle rate, the transition, the frequency, the loading capacitance, and/or the current or the current density on the via pillar 604. According to some embodiments, an EM file 608 corresponding to the via pillar 604 is applied to check if the via pillar 604 induces the EM phenomenon. The EM file 608 is similar to the EM file 508 as shown in FIG. 5. The EM file 608 records a plurality of loading capacitances C_1-C_x, a plurality of transitions T_1-T_y, and a plurality of maximum toggle rates TRA_1-TRA_z of the via pillar 604. FIG. 7 is a flowchart of the EM checking process 700 in accordance with some embodiments. The EM checking process 700 comprises operation 702-710. In operation 702, the loading capacitance and the transition on the via pillar 604 are calculated. The loading capacitance of the via pillar 604 may include the parasitic capacitance of the interconnecting path 606. In operation 704, the toggle rate on the via pillar 604 is calculated. In operation 706, a maximum toggle rate is selected from the plurality of maximum toggle rates TRA_1-TRA_z in the EM file 608 according to the transition and the loading capacitance of the via pillar 604. In this embodiment, the maximum toggle rate is TRA_2. The maximum toggle rate TRA_2 is the maximum tolerable toggle rate of the via pillar 604 under the condition of the transition and the loading capacitance. In operation 708, the toggle rate obtained in the operation 704 is compared with the maximum toggle rate TRA_2 obtained in the operation 706 to determine if the toggle rate is greater than the maximum toggle rate TRA_2. In operation 710, when the toggle rate is greater than the maximum toggle rate TRA_2, the via pillar 604 may induce the EM phenomenon. Accordingly, an EM violation occurs when the toggle rate is greater than the maximum toggle rate TRA_2. On the contrary, in operation 712, when the toggle rate is not greater or smaller than the maximum toggle rate TRA_2, the EM phenomenon may not occur.

Figure 8:
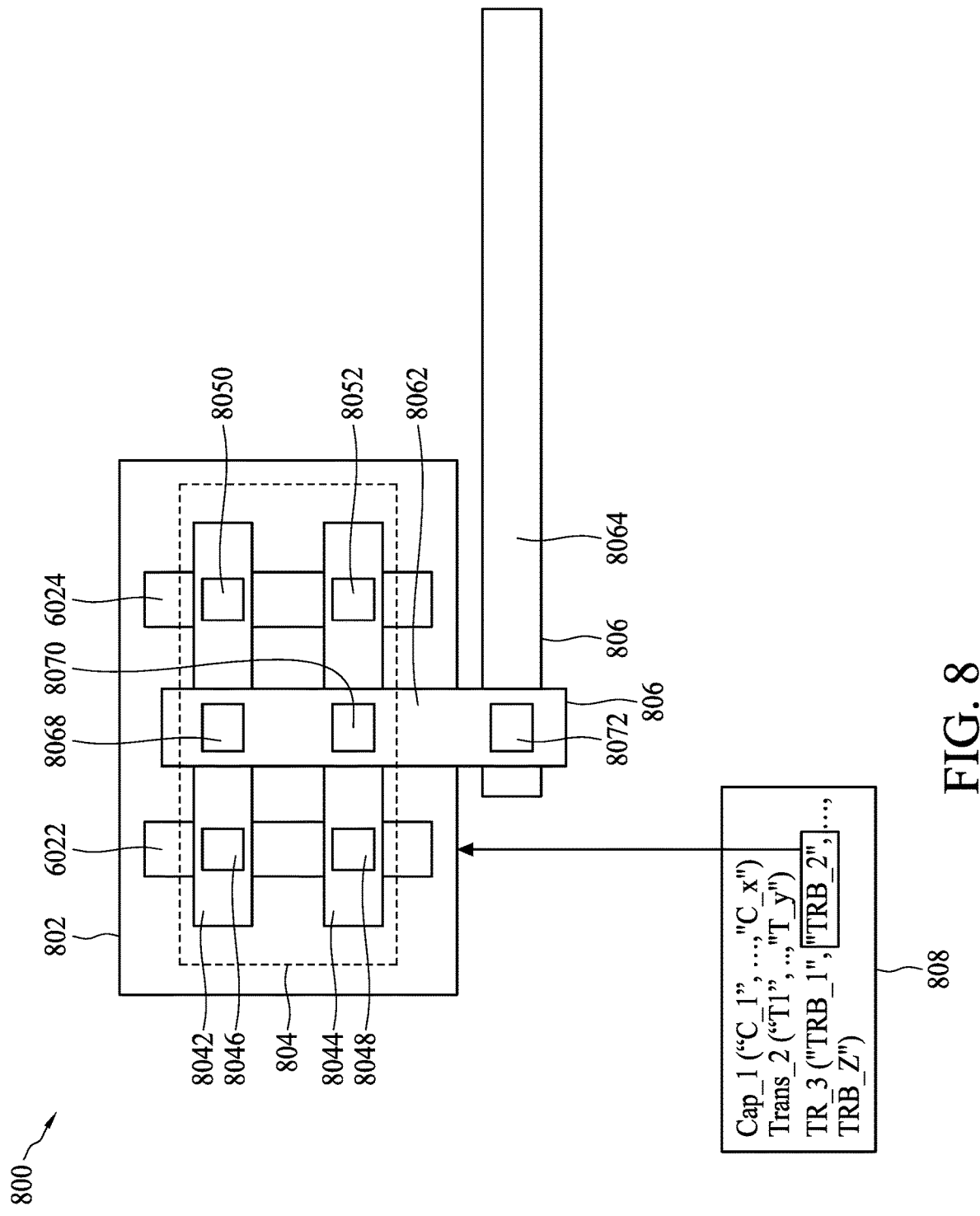
FIG. 8 is a diagram illustrating a modified circuit of an integrated circuit in accordance with some embodiments.

In operation 408, another via pillar (e.g. the via pillar 504) in the plurality of via pillars 502-506 is selected to replace the via pillar 502 of the partial circuit 600, and a modified circuit is generated as shown in FIG. 8. FIG. 8 is a diagram illustrating a modified circuit 800 of the integrated circuit in accordance with some embodiments. The partial circuit 800 comprises a standard cell 802, a via pillar 804, and an interconnecting path 806. The standard cell 802 is similar to the standard cell 602 in FIG. 6, and the standard cell 802 is represented by metal lines 6022 and 6024. The via pillar 804 may be the second via pillar 504 as shown in FIG. 5. The via pillar 804 comprises two metal lines 8042, 8044, and four vias 8046, 8048, 8050, and 8052. The metal lines 8042, 8044 are formed on the second metal layer M2. The vias 8046, 8048, 8050, and 8052 are arranged to electrically connect the metal lines 6022 and 6042 to the metal lines 8042 and 8044 respectively. The interconnecting path 806 comprises a first metal line 8062, a second metal line 8064, a first via 8068, a second via 8070, and a third via 8072. The metal line 8062 is formed on the third metal layer M3. The metal line 8064 is formed on the second metal layer M2. The vias 8068 and 8070 are arranged to electrically connect the metal lines 8042 and 8044 to the metal line 8062. The via 8072 is arranged to electrically connect the metal line 8062 to the metal line 8064. The interconnecting path 806 is arranged to electrically connect the via pillar 804 to another circuit cell (not shown).

When the via pillar 604 of the partial circuit 600 is replaced by the via pillar 804 to form the modified circuit 800, an EM file 808 corresponding to the via pillar 804 is also included for performing the EM checking process again. The EM file 808 is similar to the EM file 510 as shown in FIG. 5. The EM file 808 records the plurality of loading capacitances C_1-C_x, the plurality of transitions T_1-T_y, and the plurality of maximum toggle rates TRB_1-TRB_z of the via pillar 804. In other words, the EM checking and optimization 400 goes to the operation 406 (i.e. the EM checking process 700) for performing the EM checking process upon the modified circuit 800 to determine if the via pillar 804 induces the EM phenomenon. In the EM checking process 700, the loading capacitance of the via pillar 804 is re-calculated to obtain a modified loading capacitance since the interconnecting path 806 may re-route. In other words, the interconnecting path 806 may different from the interconnecting path 606. Then, a maximum toggle rate is selected from the plurality of maximum toggle rates TRB_1-TRB_z in the EM file 808 according to the transition and the modified loading capacitance of the via pillar 804. In this embodiment, the maximum toggle rate is TRB_2. The maximum toggle rate TRB_2 is the maximum tolerable toggle rate of the via pillar 804 under the condition of the transition and the modified loading capacitance. In this embodiment, the toggle rate of the via pillar 804 is smaller than the maximum toggle rate TRB_2, and the EM phenomenon on the via pillar 804 may be alleviated. When the toggle rate of the via pillar 804 is smaller than the maximum toggle rate TRB_2, the via pillar 804 pass the EM rule checking. It is noted that, in some embodiments, the operations 406 and 408 may repeat until the appropriate via pillar is selected. The detailed description is omitted here for brevity.

Accordingly, for the embodiment of FIG. 2, the plurality of via pillars 502-506 and the plurality of EM files 508-512 corresponding to the plurality of via pillars 502-506 respectively are provided. When a first via pillar with a first number of metal lines is replaced by a second via pillar with a second number of metal lines, in which the second number is greater than the first number, a first EM file corresponding to the first via pillar is also replaced by a second EM file corresponding to the second via pillar such that the EM checking process may apply the second EM file to check the EM violation of the second via pillar.

Figure 9:
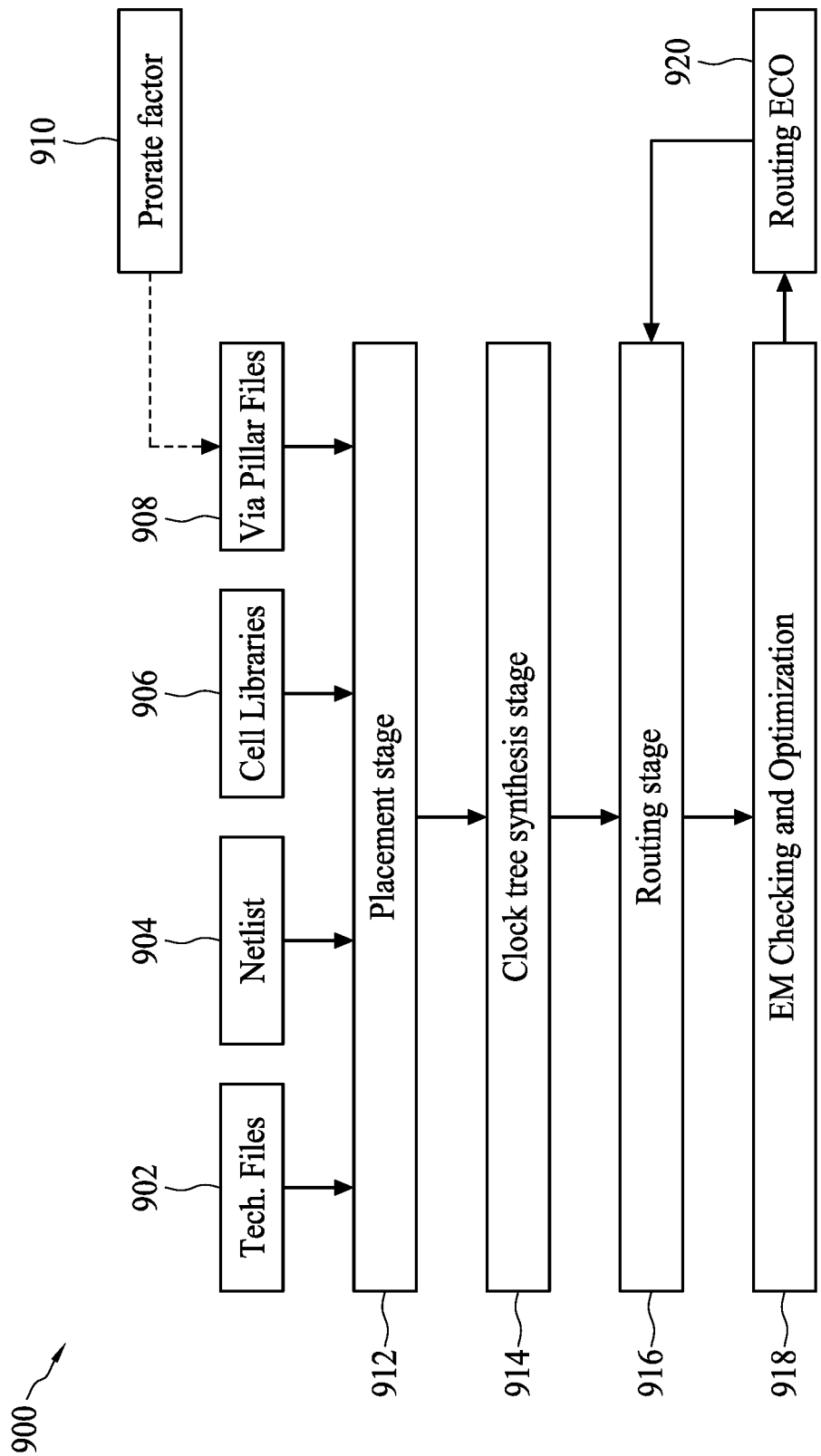
FIG. 9 is a flowchart of a process including an EM checking and optimization for an integrated circuit in accordance with some embodiments.

FIG. 9 is a flowchart illustrating a process 900 including an EM checking and optimization for the integrated circuit in accordance with some embodiments. The process 900 comprises operations 902-920. In operation 902, technology files related to the semiconductor fabricating process is provided. In operation 904, a netlist of the integrated circuit is provided. In operation 906, standard cell libraries are provided. In operation 908, via pillar files are provided. The via pillar files includes a plurality of via pillar configurations. In operation 910, at least one prorate factor is provided. The prorate factor is applied to a via pillar configuration in the via pillar files. A plurality of prorate factors may be provided in operation 910, in which each prorate factor corresponds to a metal line on a corresponding metal layer in a via pillar. For example, a first prorate factor corresponds to a metal line on the first metal layer M1 in a via pillar, and a second prorate factor corresponds to a metal line on the second metal layer M2 in a via pillar. In operation 912, a placement of the circuit cells in the integrated circuit is performed according to the technology files, the netlist, the standard cell libraries, and the via pillars. The operation 912 may similar to the above mentioned placement stage 106. In operation 914, a clock tree synthesis is performed upon the design layout of the integrated circuit. The operation 914 may similar to the above mentioned CTS stage 108. In operation 916, a routing process is performed upon the design layout of the integrated circuit. The operation 916 may similar to the above mentioned routing stage 110. In operation 918, an EM checking and optimization is performed upon the design layout of the integrated circuit is performed. The EM checking and optimization is performed after the operations 912-916. According to some embodiments, the EM checking and optimization is arranged to upgrade a via pillar into a more EM robust via pillar and/or re-route the interconnecting path to fix the EM violation based on the maximum toggle rate. The EM checking and optimization is further arranged to adjust the EM file of the modified via pillar by a prorate factor in order to modify the maximum toggle rate of the modified via pillar. In operation 920, a routing ECO operation is performed to upgrade a via pillar into a more EM robust via pillar. When the routing ECO operation is performed, the method 900 may re-route the interconnecting path to fix the EM violation based on the maximum toggle rate (i.e. the operation 920).

Figure 10:
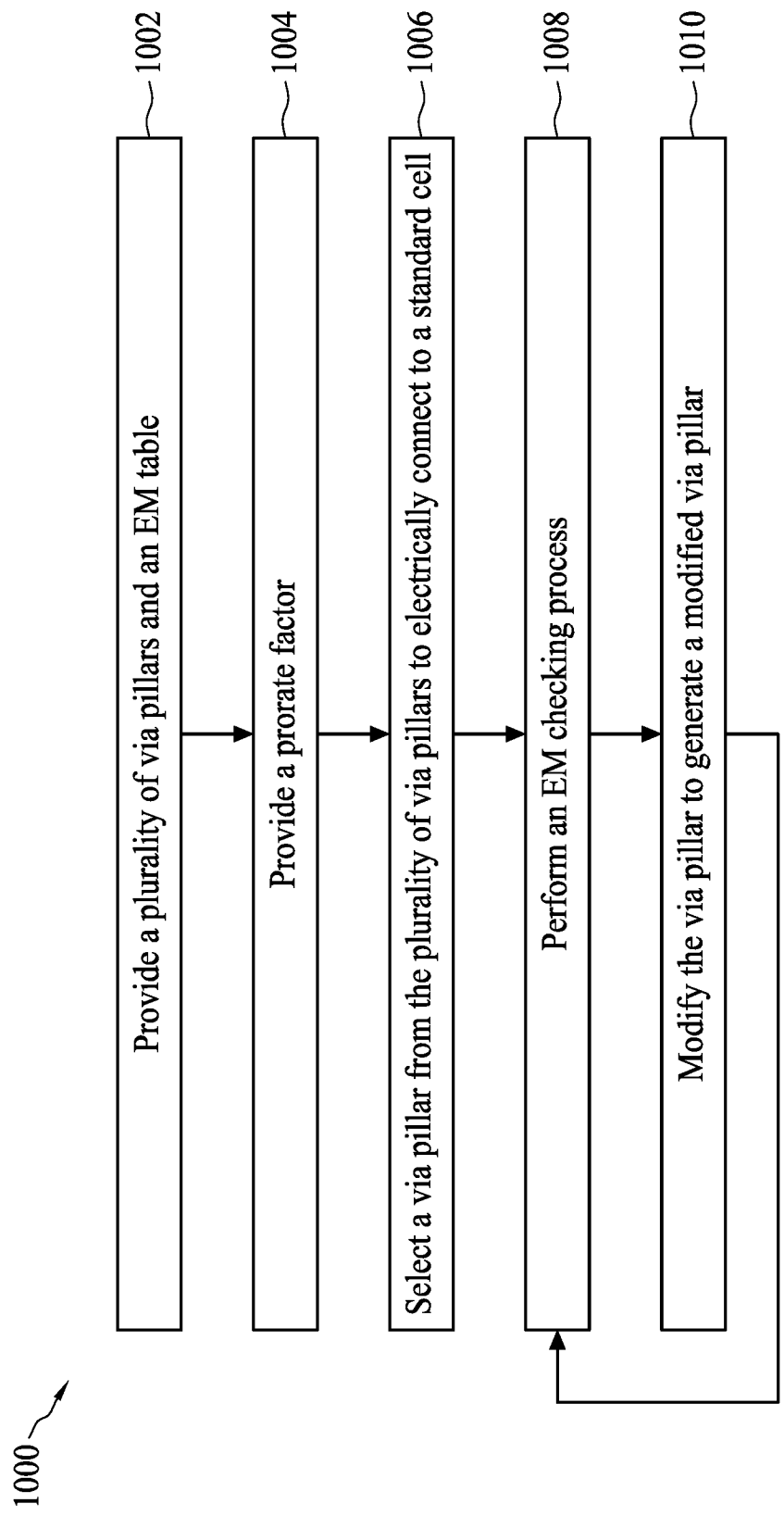
FIG. 10 is a flowchart of an EM checking and optimization for the integrated circuit in accordance with some embodiments.

FIG. 10 is a flowchart of an EM checking and optimization 1000 for the integrated circuit in accordance with some embodiments. The EM checking and optimization 1000 comprises operations 1002-1008. In operation 1002, a plurality of via pillars and an EM file are provided. In operation 1004, a prorate factor is provided. The prorate factor is arranged to modify the maximum toggle rate in the EM file according to a via pillar in the plurality of via pillars. The prorate factor is a predetermined factor.

Figure 11:
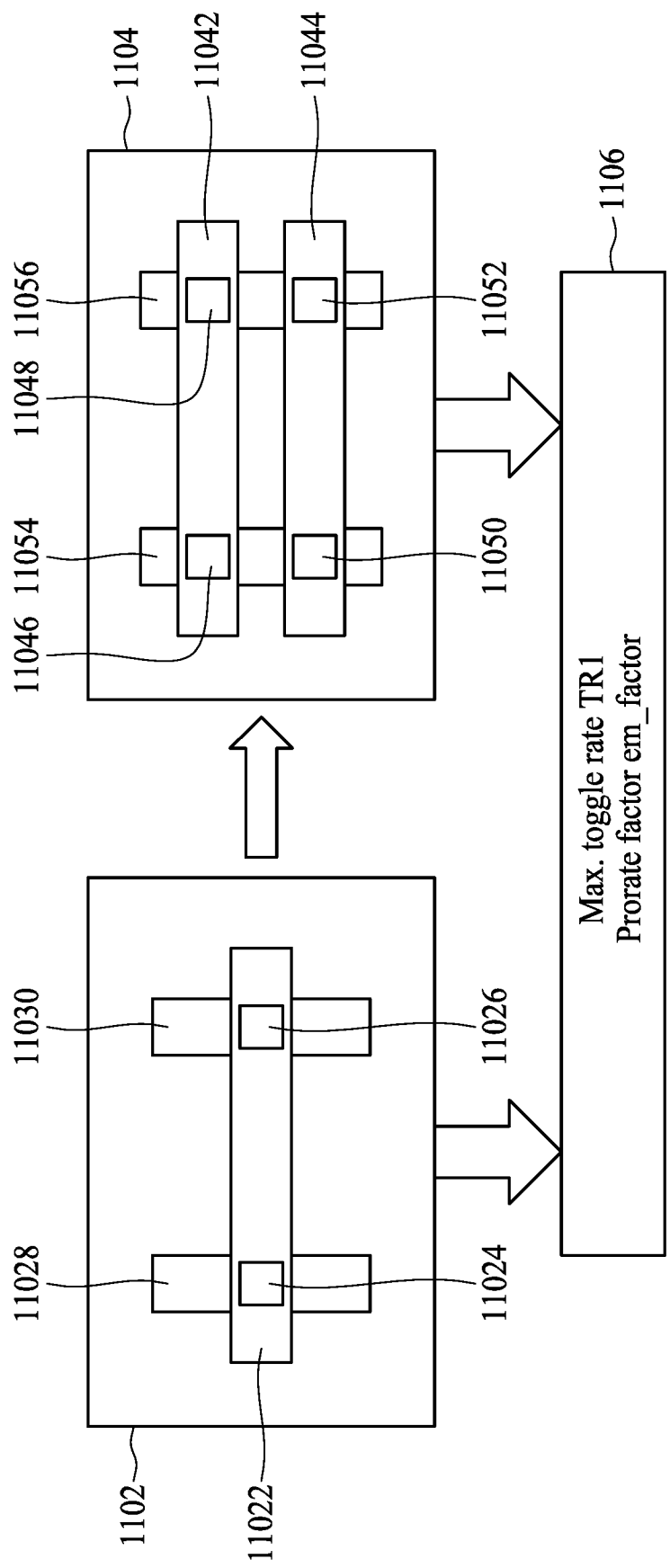
FIG. 11 is a diagram illustrating a plurality of via pillars and an EM file in accordance with some embodiments.

FIG. 11 is a diagram illustrating a plurality of via pillars 1102-1104 and an EM file 1106 in accordance with some embodiments. For brevity, FIG. 11 merely shows the top-view diagram of two different via pillars. According to some embodiments, the first via pillar 1102 comprises a metal line 11022 and two vias 11024, 11026. The vias 11024 and 11026 are arranged to electrically connect the metal line 11022 to a standard cell. For brevity, the standard cell is represented by the metal layers 11028 and 11030. The metal line 11022 may be formed on the second metal layer M2, and the metal layers 11028 and 11030 may be formed on the first metal layer M1.

The second via pillar 1104 comprises two metal lines 11042, 11044, and four vias 11046, 11048, 11050, and 11052. The vias 11046, 11048, 11050, and 11052 are arranged to electrically connect the metal lines 11042 and 11044 to a standard cell respectively. For brevity, the standard cell is represented by the metal layers 11054 and 11056. The metal lines 11042 and 11044 may be formed on the second metal layer M2, and the metal layers 11054 and 11056 may be formed on the first metal layer M1.

In comparison to the first via pillar 1102 with one metal (i.e. 11022), the second via pillar 1104 has two metal lines (i.e. 11042 and 11044) connecting to the standard cell. Therefore, the second via pillar 1104 may withstand greater toggle rate than the first via pillar 1102. In other words, the maximum tolerable toggle rate of the second via pillar 1104 is greater than the maximum tolerable toggle rate of the first via pillar 1102.

According to some embodiments, the EM file 1106 records a plurality of maximum toggle rates with respect to a plurality of loading capacitances and a plurality of transitions of the first via pillar 1102, and a prorate factor. In comparison to the EM file 508, the EM file 1106 further records the prorate factor. The function of the EM file 1106 is similar to the EM file, thus the detailed description is omitted here. For brevity, the EM file 1106 merely shows a maximum toggle rate TR1 and a prorate factor em_factor in FIG. 11. The EM file 1106 is assigned to the first via pillar 1102 and the second via pillar 1104. The maximum toggle rate TR1 is the maximum tolerable toggle rate of the first via pillar 1102. The maximum toggle rate TR2 of the second via pillar 1104 is the maximum toggle rate TR1 multiplying the prorate factor em_factor, i.e. TR2=TR1*em_factor. According to some embodiments, the prorate factor em_factor is a value greater than one, e.g. 1.3.

Accordingly, when the first via pillar 1102 is used to electrically connect to a standard cell, the maximum tolerable toggle rate of the first via pillar 1102 is TR1. When the second via pillar 1104 is used to electrically connect to a standard cell, the maximum tolerable toggle rate (i.e. TR2) of the second via pillar 1104 is modified by the prorate factor em_factor.

Figure 12:
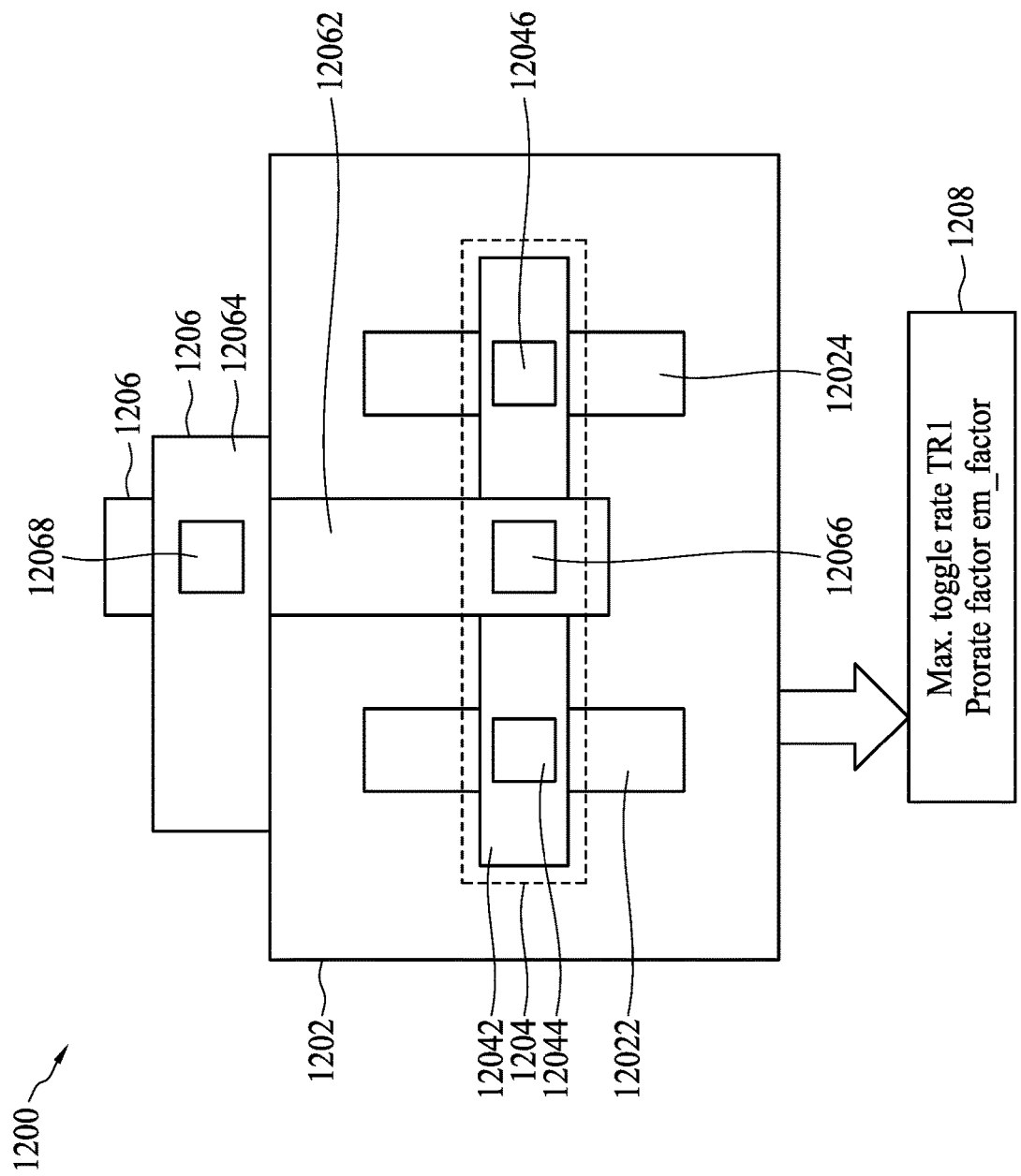
FIG. 12 is a diagram illustrating a partial circuit of an integrated circuit in accordance with some embodiments.

In operation 1006, a via pillar in the plurality of via pillars 1102-1104 is selected to electrically connect to a standard cell of the integrated circuit during the routing stage. FIG. 12 is a diagram illustrating a partial circuit 1200 of the integrated circuit in accordance with some embodiments. The partial circuit 1200 comprises a standard cell 1202, a via pillar 1204, and an interconnecting path 1206. The standard cell 1202 is represented by metal lines 12022 and 12024. The standard cell 1202 is similar to the standard cell 1102. The via pillar 1204 comprises a metal line 12042 and two vias 12044, 12046. The via pillar 1204 is similar to the first via pillar 1102 as shown in FIG. 11, thus the detailed description is omitted here for brevity. The interconnecting path 1206 comprises a first metal line 12062, a second metal line 12064, a first via 12066, and a second via 12068. The metal line 12062 is formed on the third metal layer M3. The metal line 12064 is formed on the second metal layer M4. The vias 12066 is arranged to electrically connect the metal line 12042 to the metal line 12062. The vias 12068 is arranged to electrically connect the metal line 12062 to the metal line 12064. The interconnecting path 1206 is arranged to electrically connect the via pillar 1204 to another circuit cell (not shown).

In operation 1008, an EM checking process is performed upon the partial circuit 1200 to determine if the via pillar 1204 induces the EM phenomenon. The EM checking process may analyze the EM information of the via pillar 1204 in the partial circuit 1200. The EM information may be the toggle rate, the transition, the frequency, the loading capacitance, and/or the current or the current density on the via pillar 604. According to some embodiments, an EM file 1208 is applied to check if the via pillar 1204 induces the EM phenomenon. The EM file 1208 is similar to the EM file 1106 as shown in FIG. 11. The EM file 1208 records a maximum toggle rate TR1 and a prorate factor em_factor. The operation 1008 is similar to the EM checking process 700 of FIG. 7, thus the detailed description is omitted here for brevity. In operation 1008, the toggle rate of the via pillar 1204 is compared with the maximum toggle rate TR1. When the toggle rate is greater than the maximum toggle rate TR1, the via pillar 1204 may induce the EM phenomenon. On the contrary, when the toggle rate is not greater or smaller than the maximum toggle rate TR1, the EM phenomenon may not occur.

Figure 13:
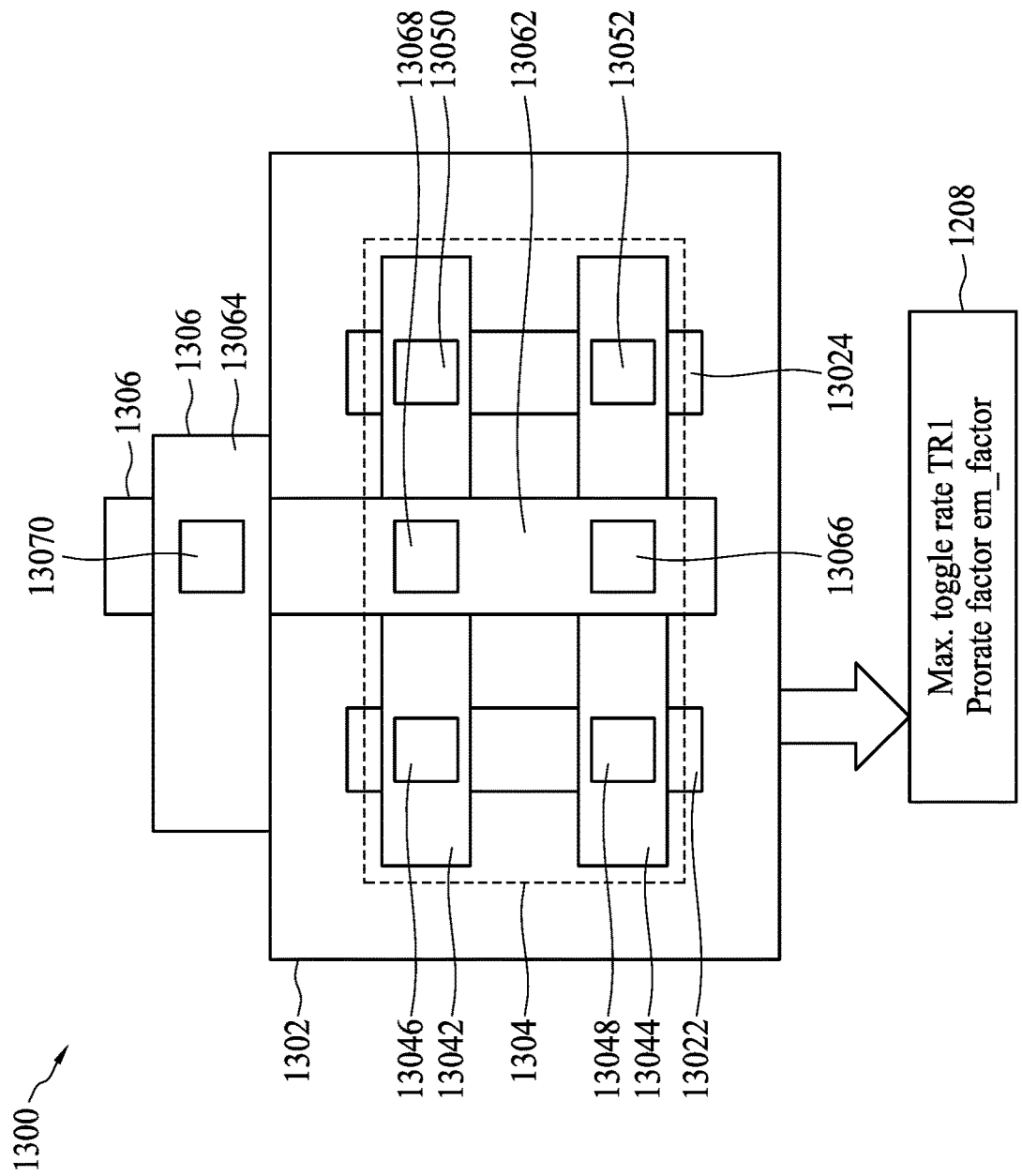
FIG. 13 is a diagram illustrating a modified circuit of an integrated circuit in accordance with some embodiments.

In operation 1010, the via pillar 1204 is modified to be a modified via pillar, i.e. the via pillar 1304. According to some embodiments, the via pillar 1104 in the plurality of via pillars 1102-1104 may be selected to replace the via pillar 1204 of the partial circuit 1200. A modified circuit is generated as shown in FIG. 13. FIG. 13 is a diagram illustrating a modified circuit 1300 of the integrated circuit in accordance with some embodiments. The partial circuit 1300 comprises a standard cell 1302, a via pillar 1304, and an interconnecting path 1306. The standard cell 1302 is similar to the standard cell 1202 in FIG. 12, and the standard cell 1302 is represented by metal lines 13022 and 13024. The via pillar 1304 may be the second via pillar 1104 as shown in FIG. 11. The via pillar 1304 comprises two metal lines 13042, 13044, and four vias 13046, 13048, 13050, and 13052. The via pillar 1304 is similar to the second via pillar 1104 as shown in FIG. 11, thus the detailed description is omitted here for brevity. The interconnecting path 1306 comprises a first metal line 13062, a second metal line 13064, a first via 13066, a second via 13068, and a third via 13070. The metal line 13062 is formed on the third metal layer M3. The metal line 13064 is formed on the fourth metal layer M4. The vias 13066 and 13068 are arranged to electrically connect the metal lines 13042 and 13044 to the metal line 13062. The via 13070 is arranged to electrically connect the metal line 13062 to the metal line 13064. The interconnecting path 1306 is arranged to electrically connect the via pillar 1304 to another circuit cell (not shown).

According to some embodiments, the via pillar 1304 may be formed by directly adding a metal line (e.g. 12044) into the via pillar 1204. The metal line (e.g. 12044) is parallel to the metal line 12042. When the configuration of the via pillar 1204 is changed, the configuration of the interconnecting path 1206 is changed accordingly.

When the via pillar 12047 of the partial circuit 1200 is replaced by the via pillar 1304 to form the modified circuit 1300, the EM file 1208 is again used for performing the EM checking process again. The EM checking and optimization 1000 goes to the operation 1008 for performing the EM checking process upon the modified circuit 1300 to determine if the via pillar 1304 induces the EM phenomenon. The operation 1008 is similar to the EM checking process 700 of FIG. 7, thus the detailed description is omitted here for brevity. In operation 1008, the maximum toggle rate TR2 of the via pillar 1304 is obtained by multiplying the maximum toggle rate TR1 by the prorate factor em_factor, i.e. TR2=TR1*em_factor. In this embodiment, the toggle rate of the via pillar 1304 is smaller than the maximum toggle rate TR2, and the EM phenomenon on the via pillar 1304 may be alleviated. When the toggle rate of the via pillar 1304 is smaller than the maximum toggle rate TR2, the via pillar 1304 pass the EM rule checking. It is noted that, in some embodiments, the operations 1008 and 1010 may repeat until the appropriate via pillar is selected. The detailed description is omitted here for brevity.

In this embodiment, the via pillar 1304 is formed by adding one metal line to the via pillar 1204, thus the maximum toggle rate TR2 of the via pillar 1304 is obtained by multiplying the maximum toggle rate TR1 by the prorate factor em_factor, i.e. TR2=TR1*em_factor. If the via pillar 1304 is formed by adding two metal lines to the via pillar 1204, the maximum toggle rate TR2 of the via pillar 1304 may be obtained by multiplying the maximum toggle rate TR1 by a double of the prorate factor em_factor, i.e. TR2=TR1*2*em_factor. In other words, the prorate factor em_factor is the factor of toggle rate for one metal line in a via pillar. The maximum toggle rate of a via pillar may be scaled by the prorate factor em_factor according to the number of metal lines in the via pillar.

Accordingly, for the embodiment of FIG. 9, the plurality of via pillars 1102-1104 and the EM file 1106 assigned to the plurality of via pillars 1102-1104 are provided. When a first via pillar is replaced by a second via pillar, the maximum toggle rate in the EM file 1106 is multiplied by a prorate factor to obtain a modified maximum toggle rate corresponding to the second via pillar such that the EM checking process may apply the modified maximum toggle rate to check the EM violation of the second via pillar.

Figure 14:
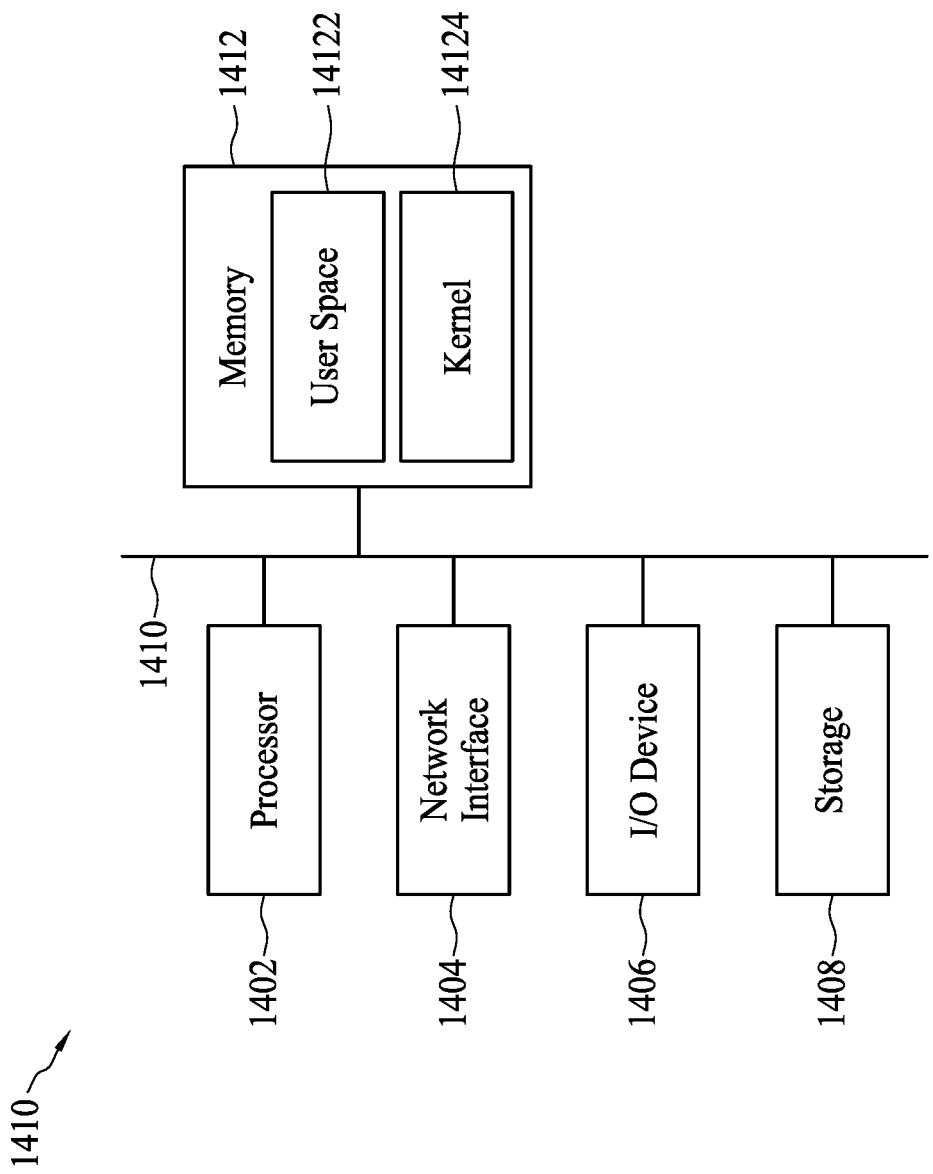
FIG. 14 is a diagram of a hardware system for implementing a process including an EM checking and optimization in accordance with some embodiments.

FIG. 14 is a diagram of a hardware system 1400 for implementing the process 200 (or the process 900) to generate the modified circuit 800 (or the modified circuit 1300) in accordance with some embodiments. The system 1400 includes at least one processor 1402, a network interface 1404, an input and output (I/O) device 1406, a storage 1408, a memory 1412, and a bus 1410. The bus 1410 couples the network interface 1404, the I/O device 1406, the storage 1408 and the memory 1412 to the processor 1402.

In some embodiments, the memory 1412 comprises a random access memory (RAM) and/or other volatile storage device and/or read only memory (ROM) and/or other non-volatile storage device. The memory 1412 includes a kernel 14124 and user space 14122, configured to store program instructions to be executed by the processor 1402 and data accessed by the program instructions.

In some embodiments, the network interface 1404 is configured to access program instructions and data accessed by the program instructions stored remotely through a network. The I/O device 1406 includes an input device and an output device configured for enabling user interaction with the system 1400. The input device comprises, for example, a keyboard, a mouse, etc. The output device comprises, for example, a display, a printer, etc. The storage device 1408 is configured for storing program instructions and data accessed by the program instructions. The storage device 1408 comprises, for example, a magnetic disk and an optical disk. According to some embodiments, the storage device 1408 is further configured to pre-store the plurality of via pillar files (e.g. 502-506 and 1102-1104) and a plurality of EM files (e.g. 508-512 and 1106) of the embodiments.

In some embodiments, when executing the program instructions, the processor 1402 is configured to perform the operations of the process 200 (or the process 900) as described with reference to FIG. 2 (or FIG. 9).

In some embodiments, the program instructions are stored in a non-transitory computer readable recording medium such as one or more optical disks, hard disks and non-volatile memory devices.

Figure 15:
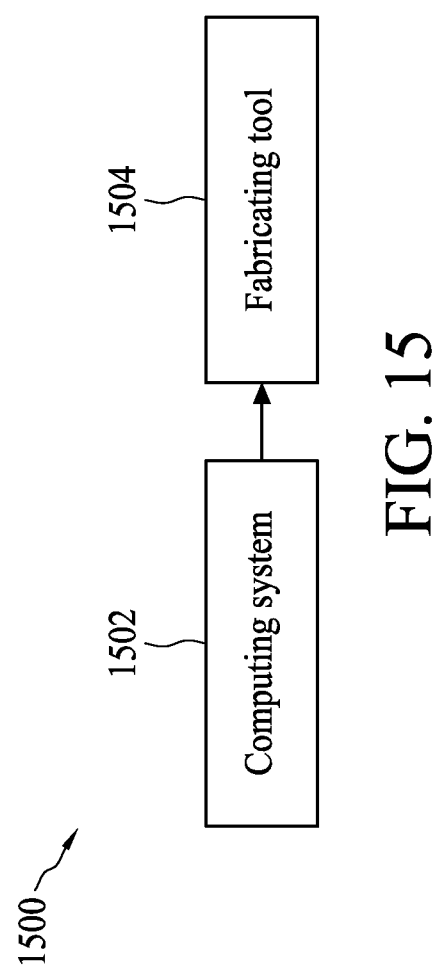
FIG. 15 is a diagram of a system for fabricating a modified circuit in accordance with some embodiments.

FIG. 15 is a diagram of a system 1500 for fabricating the modified circuit 800 (or the modified circuit 1300) in accordance with some embodiments. The system 1500 comprises a computing system 1502 and a fabricating tool 1504. The computing system 1502 is arranged to perform operations of the process 200 (or the process 900) to generate the circuit layout of the modified circuit 800 (or the modified circuit 1300). The computing system 1502 may be the above system 1400. The fabricating tool 1504 may be a cluster tool for fabricating an integrated circuit. The cluster tool may be a multiple reaction chamber type composite equipment which includes a polyhedral transfer chamber with a wafer handling robot inserted at the center thereof, a plurality of process chambers positioned at each wall face of the polyhedral transfer chamber; and a loadlock chamber installed at a different wall face of the transfer chamber. At the fabrication stage, at least one photomask is used, for example, for one patterning operation for forming a feature of ICs, such as gate lines of transistors, source or drain regions for the transistors, metal lines for interconnects and vias for the interconnects, on a wafer.

Briefly, the above embodiments provide an EM-aware via pillar optimization technique after the placement stage, CTS stage, and routing stage. Each via pillar is designed to have appropriate output pin or metal line based on the loading capacitance to alleviate the EM phenomenon and obtain better PPA result with reduced pin density.

According to some embodiments, a method of forming an integrated device is provided. The method comprises: providing a first via pillar file specifying a first via pillar; providing a second via pillar file specifying a second via pillar; arranging, by a processor, the first via pillar to electrically connect to a circuit cell in a first circuit; arranging an interconnecting path for electrical connection of the first via pillar to another circuit cell; arranging, by the processor, the second via pillar to replace the first via pillar when the first via pillar induces an electromigration (EM) phenomenon; re-routing the interconnecting path with replacement of the first via pillar to generate a second circuit when the first via pillar induces the EM phenomenon; and generating the integrated device according to the second circuit.

According to some embodiments, a method of forming an integrated device is provided. The method comprises: arranging a first via pillar to electrically connect to a circuit cell in a first circuit; arranging an interconnecting path for electrical connection of the first via pillar to another circuit cell; modifying the first via pillar to generate a modified via pillar when the first via pillar induces an electromigration (EM) phenomenon; re-routing the interconnecting path with generation of the modified via pillar when the first via pillar induces the EM phenomenon; generating a second circuit according to the modified via pillar; and generating the integrated device according to the second circuit.

According to some embodiments, a system of forming an integrated device is provided. The system comprises a storage tool, at least one processor, and a fabricating tool. The storage tool is arranged to store a first via pillar file specifying a first via pillar and a second via pillar file specifying a second via pillar. The at least one processor is configured to execute program instructions which configure the at least one processor as a processing tool that performs operations comprising: arranging the first via pillar to electrically connect to a circuit cell in a first circuit; arranging an interconnecting path for electrical connection of the first via pillar to another circuit cell; arranging the second via pillar to replace the first via pillar of the circuit cell when the first via pillar induces an electromigration (EM) phenomenon; and re-routing the interconnecting path with replacement of the first via pillar to generate a second circuit when the first via pillar induces the EM phenomenon. The fabricating tool is arranged to generate the integrated device according to the second circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated device, the method comprising:
providing a first via pillar file specifying a first via pillar;
providing a second via pillar file specifying a second via pillar;
arranging, by a processor, the first via pillar to electrically connect to a circuit cell in a first circuit;
arranging an interconnecting path for electrical connection of the first via pillar to another circuit cell in the first circuit;
arranging, by the processor, the second via pillar to replace the first via pillar when the first via pillar induces an electromigration (EM) phenomenon;
re-routing the interconnecting path with replacement of the first via pillar to generate a second circuit when the first via pillar induces the EM phenomenon; and
generating the integrated device according to the second circuit.

2. The method of claim 1, wherein the first via pillar comprises a first number of metal lines, the second via pillar comprises a second number of metal lines, and the second number is greater than the first number.

3. The method of claim 1, wherein the first via pillar comprises a metal line, the second via pillar comprises a plurality of metal lines.

4. The method of claim 1, further comprising:
providing a plurality of EM files corresponding to a plurality of via pillars, respectively, the plurality of via pillars comprising the first via pillar and the second via pillar, wherein each EM file of the plurality of EM files records a plurality of maximum toggle rates with respect to a plurality of loading capacitances and a plurality of transitions of a corresponding via pillar in the plurality of via pillars; and
determining if the first via pillar induces the EM phenomenon by analyzing EM information of the first circuit according a first EM file of the first via pillar.

5. The method of claim 4, wherein the determining if the first via pillar induces the EM phenomenon by analyzing EM information of the first circuit according to a first EM file of the first via pillar comprises:
calculating a first toggle rate on the first via pillar;
determining if the first toggle rate is greater than a first maximum toggle rate selected from the plurality of maximum toggle rates in the first EM file of the first via pillar; and
determining the first via pillar induces the EM phenomenon when the first toggle rate is greater than the first maximum toggle rate of the first via pillar.

6. The method of claim 5, wherein the determining if the first toggle rate is greater than a first maximum toggle rate selected from the plurality of maximum toggle rates in the first EM file of the first via pillar further comprises:
calculating a first loading capacitance of the first via pillar according to the interconnecting path; and
selecting the first maximum toggle rate from the plurality of maximum toggle rates in the first EM file according to a first transition of the first via pillar and the first loading capacitance of the first via pillar.

7. The method of claim 6, wherein the arranging the second via pillar to replace the first via pillar when the first via pillar induces an EM phenomenon comprises:
selecting a second EM file from the plurality of EM files according to the first toggle rate, the first loading capacitance and the first transition; and
selecting the second via pillar from the plurality of via pillars according to the second EM file.

8. The method of claim 7, wherein the second EM file comprises a second maximum toggle rate greater than the first toggle rate, and the second maximum toggle rate corresponds to the first loading capacitance and the first transition.

9. The method of claim 7, wherein the selecting the second via pillar from the plurality of via pillars according to the second EM file comprises:
  selecting the second via pillar from the plurality of via pillars by analyzing the EM information of the first circuit according to the second EM file.

10. A method of forming an integrated device, the method comprising:
  arranging a first via pillar to electrically connect to a circuit cell in a first circuit;
  arranging an interconnecting path for electrical connection of the first via pillar to another circuit cell in the first circuit;
  modifying the first via pillar to generate a modified via pillar when the first via pillar induces an electromigration (EM) phenomenon;
  re-routing the interconnecting path with generation of the modified via pillar when the first via pillar induces the EM phenomenon;
  generating a second circuit according to the modified via pillar; and
  generating the integrated device according to the second circuit.

11. The method of claim 10, wherein the first via pillar comprises a first number of metal lines, the modified via pillar comprises a second number of metal lines, and the second number is greater than the first number.

12. The method of claim 10, wherein the first via pillar comprises one metal line, and the modified via pillar comprises a plurality of metal lines.

13. The method of claim 10, further comprising:
  providing an EM file corresponding to the first via pillar; and
  determining if the first via pillar induces the EM phenomenon by analyzing EM information of the first circuit according to the EM file;
  wherein the EM file records a plurality of maximum toggle rates with respect to a plurality of loading capacitances and a plurality of transitions of the first via pillar, and a prorate factor.

14. The method of claim 13, wherein a value of the prorate factor is greater than 1.

15. The method of claim 13, wherein the determining if the first via pillar induces the EM phenomenon by analyzing EM information of the first circuit according to the EM file comprises:
  calculating a first toggle rate on the first via pillar;
  determining if the first toggle rate is greater than a first maximum toggle rate selected from the plurality of maximum toggle rates in the EM file; and
  determining the first via pillar induces an EM phenomenon when the first toggle rate is greater than the first maximum toggle rate of the first via pillar.

16. The method of claim 15, wherein the determining if the first via pillar induces the EM phenomenon by analyzing EM information of the first circuit according to the EM file further comprises:
  calculating a first loading capacitance of the first via pillar according to the interconnecting path; and
  selecting the first maximum toggle rate from the plurality of maximum toggle rates in the EM file according to a first transition of the first via pillar and the first loading capacitance of the first via pillar.

17. The method of claim 15, wherein the first via pillar comprises a first metal line, and the modifying the first via pillar to generate a modified via pillar when the first via pillar induces an EM phenomenon comprises:
  adding a second metal line to the first via pillar to generate the modified via pillar accordingly;
  wherein the generating a second circuit according to the modified via pillar comprises:
  multiplying the first maximum toggle rate by the prorate factor to generate a second maximum toggle rate;
  determining if the modified via pillar induces the EM phenomenon by analyzing the EM information of the first circuit according to the second maximum toggle rate; and
  generating the second circuit according to the modified via pillar.

18. A system of forming an integrated device, the system comprising:
  a storage tool, arranged to store a first via pillar file specifying a first via pillar and a second via pillar file specifying a second via pillar;
  at least one processor, configured to execute program instructions which configure the at least one processor as a processing tool that performs operations comprising:
  arranging the first via pillar to electrically connect to a circuit cell in a first circuit;
  arranging an interconnecting path for electrical connection of the first via pillar to another circuit cell in the first circuit;
  arranging the second via pillar to replace the first via pillar of the circuit cell when the first via pillar induces an electromigration (EM) phenomenon; and
  re-routing the interconnecting path with replacement of the first via pillar to generate a second circuit when the first via pillar induces the EM phenomenon.

19. The system of claim 18, wherein the system further comprises:
  a fabricating tool, arranged to generate the integrated device according to the second circuit;
  wherein the storage tool is further arranged to provide a plurality of EM files corresponding to a plurality of via pillars, respectively, the plurality of via pillars comprising the first via pillar and the second via pillar;
  wherein each EM file of the plurality of EM files records a plurality of maximum toggle rates with respect to a plurality of loading capacitances and a plurality of transitions of a corresponding via pillar in the plurality of via pillars.

20. The system of claim 19, wherein the first via pillar corresponds to a first EM file in the plurality of EM files, and the processing tool is further arranged to select a second EM file from the plurality of EM files, and to select the second via pillar from the plurality of via pillars according to the second EM file.

* * * * *